Oct. 17, 1961 R. W. COUFFER, JR., ET AL 3,004,710
ADJUSTABLE THERMOSTATIC VALVE
Filed Jan. 7, 1958 5 Sheets-Sheet 5
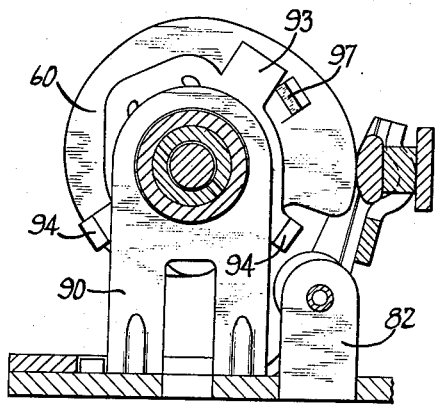
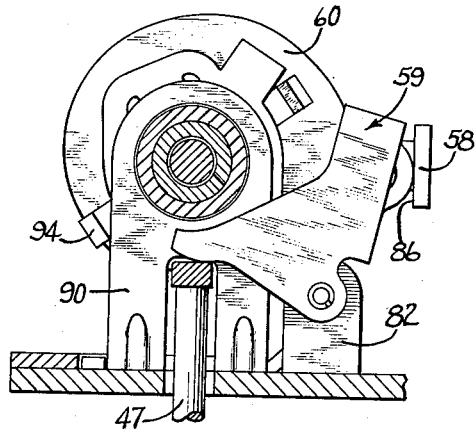
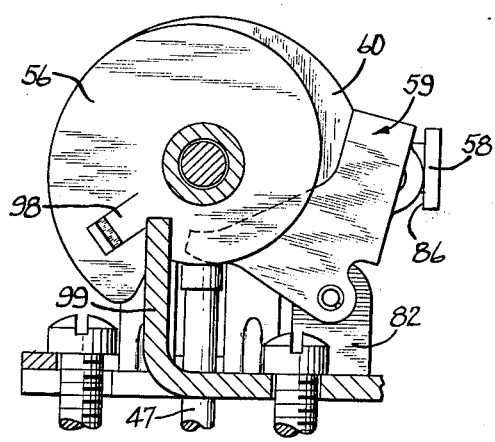
Inventors
Robert W. Couffer Jr.
Richard H. Powell
Attys

United States Patent Office 3,004,710
Patented Oct. 17, 1961

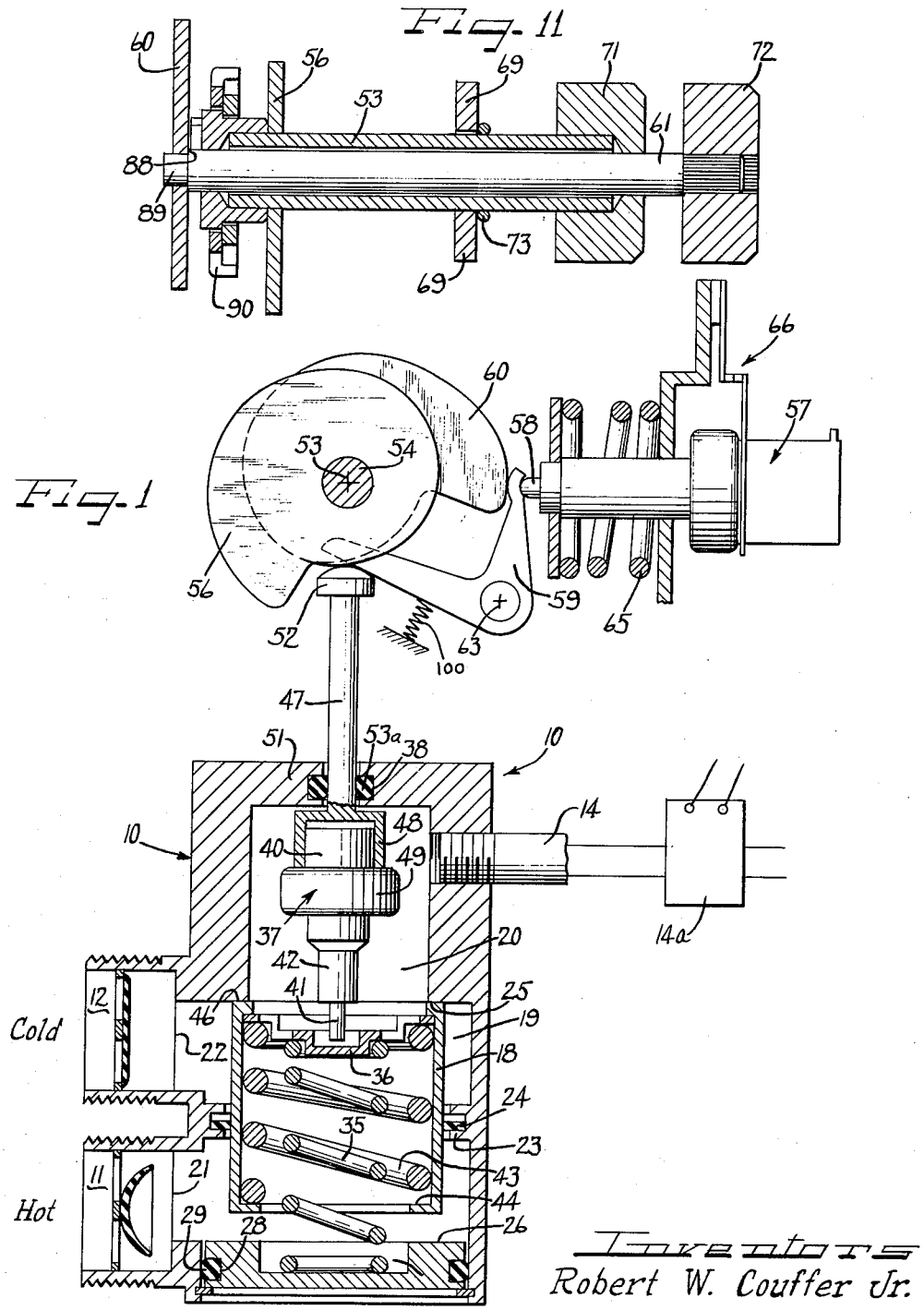

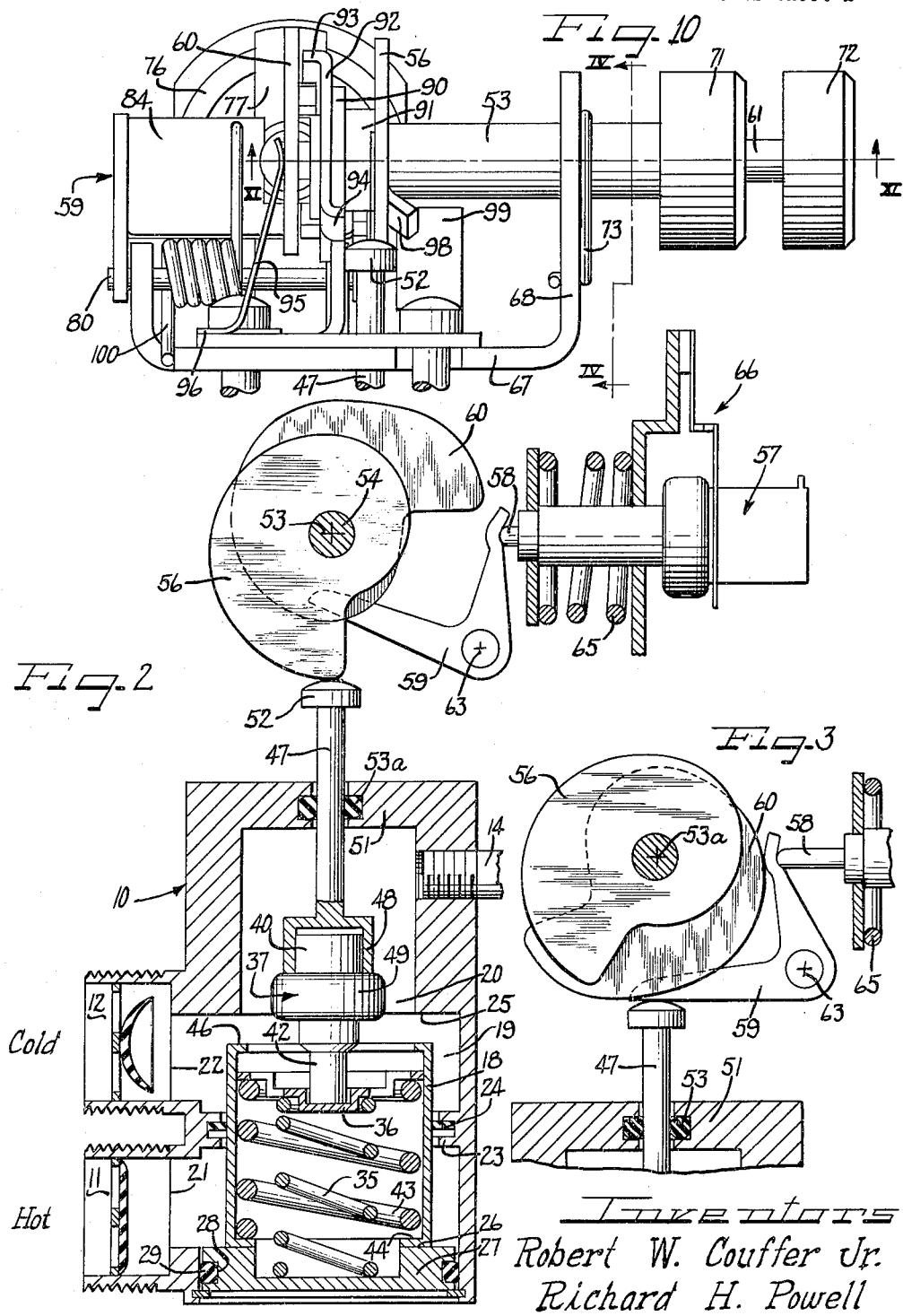

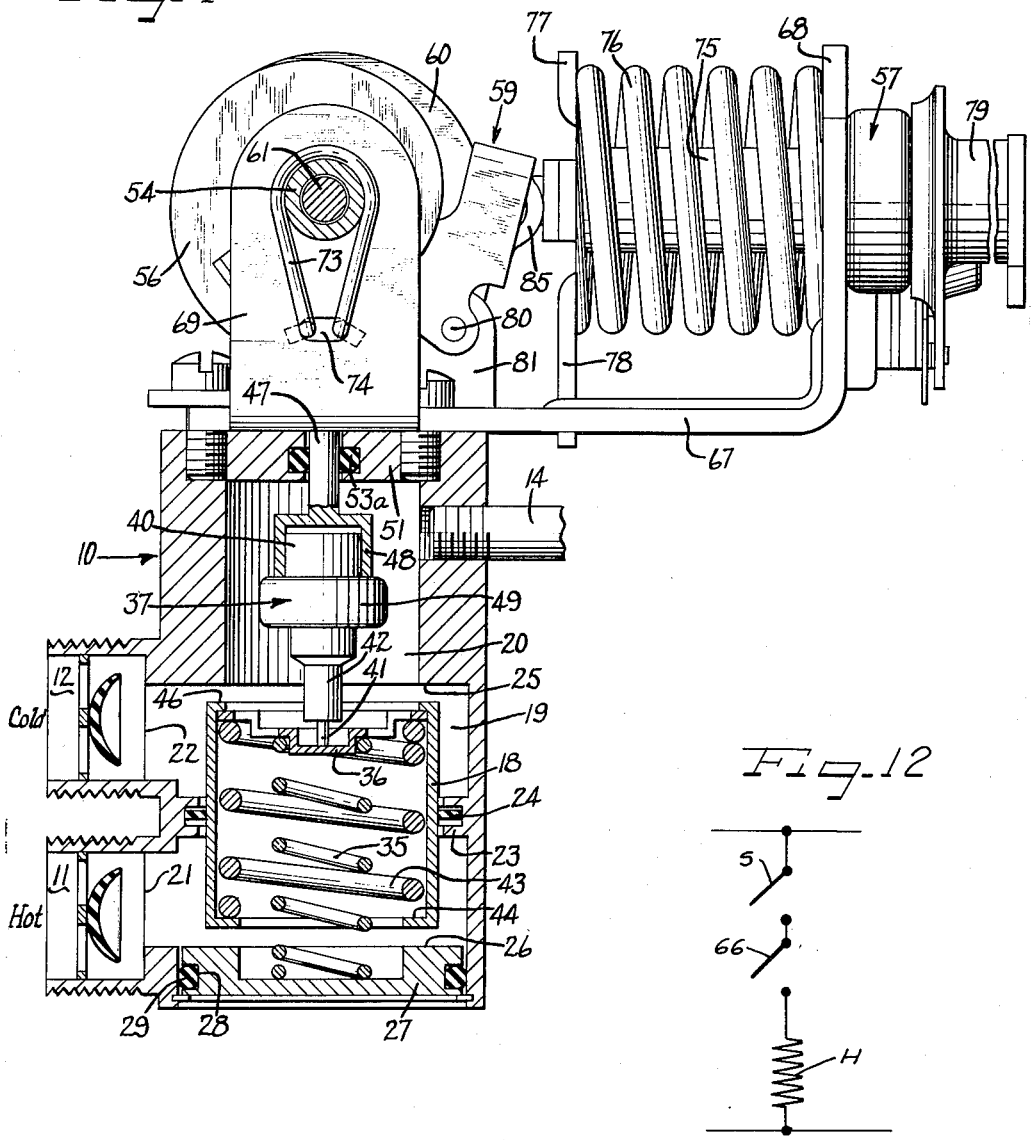

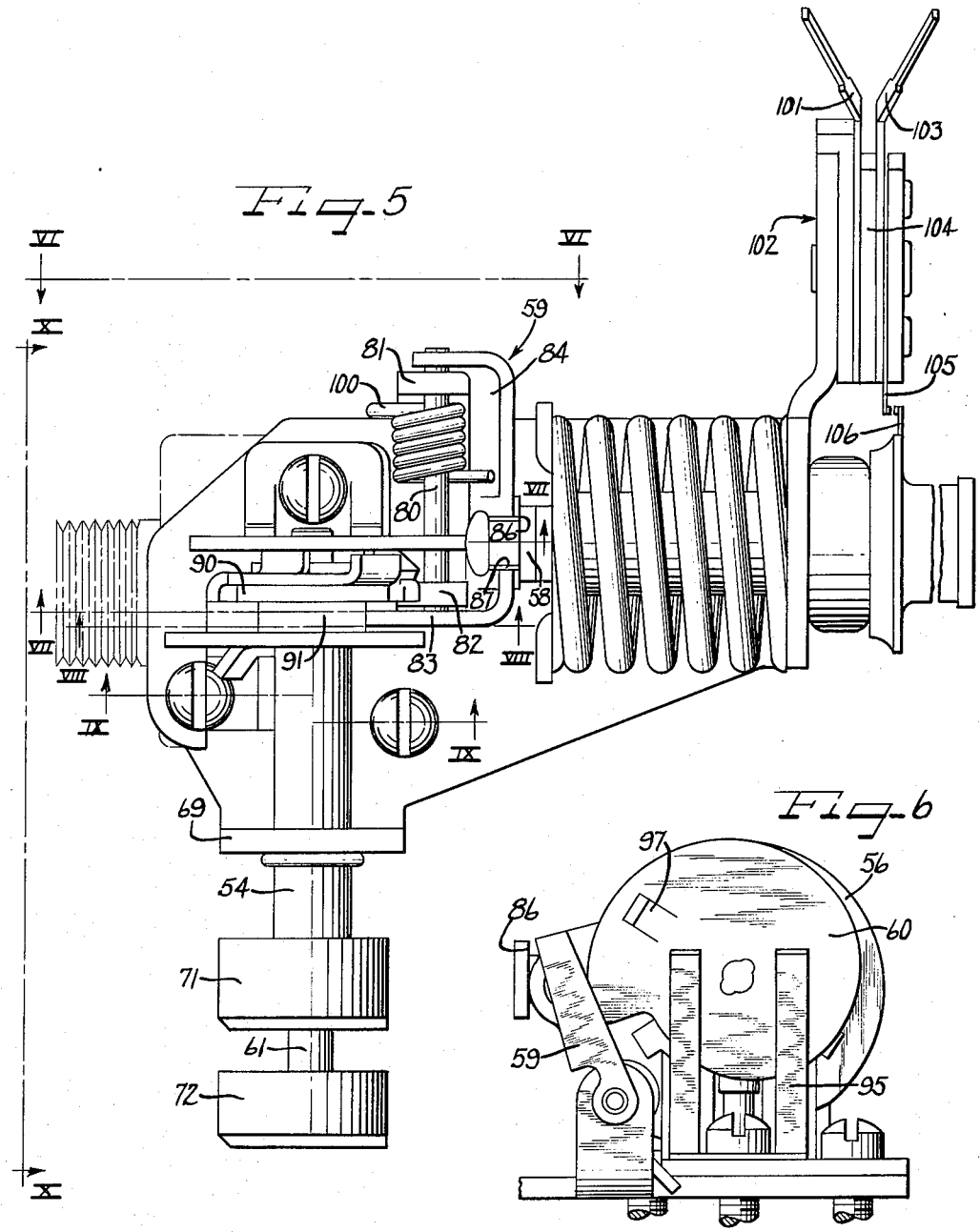

3,004,710
ADJUSTABLE THERMOSTATIC VALVE
Robert W. Couffer, Jr., Oak Park, and Richard H. Powell, Lake Zurich, Ill., assignors to The Dole Valve Company, Morton Grove, Ill.
Filed Jan. 7, 1958, Ser. No. 707,546
3 Claims. (Cl. 236—12)

This invention relates to improvements in thermostatic fluid mixing valves and more particularly relates to such valves in which a plurality of delivery temperatures of the water may be individually selected and predetermined.

A principal object of the invention is to provide an improved form of thermostatically controlled valve for mixing hot and cold water, adjustable to deliver water at a control temperature, at any temperature from the temperature of the cold water entering the valve to the temperature of the hot water entering the valve.

Another object of the invention is to provide a thermostatic cyclically controlled mixing valve particularly adapted for washing machines and the like and operable under the cyclic control of the machine for supplying water at various temperatures independently preselected for the separate washing and rinsing operations from the temperature of the cold water entering the valve to that of the hot water entering the valve.

A still further object of the invention is to provide novel means for maintaining two precise temperature controls in an automatic washing machine or the like, one for wash functions and one for rinse functions, in which the controls are independently variable but with the rinse temperature never exceeding the wash temperature.

These and other objects of the invention will appear from time to time as the following specification proceeds and with reference to the accompanying drawings wherein:

FIGURE 1 is a diagrammatic vertical sectional view through the valve and valve positioning means, set to deliver only hot water through the outlet;

FIGURE 2 is a view similar to FIGURE 1, but showing the valve set to deliver cold water through the outlet;

FIGURE 3 is a fragmentary view similar to the upper portions of FIGURES 1 and 2 showing the operation of the valve positioning means during the rinse cycle;

FIGURE 4 is a vertical sectional view through the valve taken along the line IV—IV of FIGURE 10 showing an actuating mechanism for positioning the thermal element within the mixing chamber constructed in accordance with the present invention, and showing some parts in section and others in side elevation;

FIGURE 5 is a plan view of a valve constructed in accordance with this invention;

FIGURE 6 is a fragmentary side elevational view taken along line VI—VI of FIGURE 5;

FIGURE 7 is a fragmentary view taken substantially along lines VII—VII of FIGURE 5 showing some parts in section and others in side elevation;

FIGURE 8 is a fragmentary sectional view taken along lines VIII—VIII of FIGURE 5 and showing some parts in section and others in side elevation;

FIGURE 9 is a fragmentary sectional view taken along the lines IX—IX of FIGURE 5, and showing some parts in section and others in side elevation;

FIGURE 10 is a fragmentary side elevational view taken along lines X—X of FIGURE 5;

FIGURE 11 is a sectional view taken substantially along lines XI—XI of FIGURE 5; and FIGURE 12 is a diagrammatic illustration of the electrical energizing circuit for controlling energization of the heat motor.

In the embodiment of the invention illustrated in the drawings an adjustable thermostatic mixing valve is shown having a valve body 10, with hot and cold water inlets 11 and 12 respectively leading thereinto, with an outlet 14 leading therefrom. The outlet 14 is preferably provided with an electrically controlled shut-off valve such as the diagrammatically illustrated shut-off valve 14a in FIGURE 1.

It will be noted that the internal structure of the valve body 10 is shown diagrammatically in order to simplify the explanation of the operation of applicant's novel device.

This internal structure of the valve per se is described in detail and claimed in the copending application Serial No. 611,152 of Victor E. Rimsha which was filed on September 21, 1956, assigned to the same assignee as the present invention.

Generally, a hollow piston valve 18 is provided within the valve body 10 to meter hot and cold water into the metering chamber 19 and a mixing chamber 20 from a metering chamber 19 and through the inlet ports 21 and 22 respectively, leading through the wall of the metering chamber. The piston valve 18 is slidably mounted in a correspondingly shaped guide member 23 extending from a wall of the metering chamber 19 and is circumferentially engaged by a ring seal 24 which is held in engagement therewith by guide member 23. As may be clearly seen in the drawings a shoulder 25 is provided on the valve body 10 to form a seat for the reciprocally movable valve piston 18. Similarly the inner annular surface 26 of an end cap 27, also provides a seat for the valve piston 18. A circumferential grooved portion 28 of the end cap 27 is arranged to receive an O ring seal 29.

A spring 35, seated at one end in a recess 30 of the end cap 27 and at its opposite end on a stirrup 36 for a thermal element 37, is provided to bias the piston valve 18 upwardly into engagement with the face of the flange 25 and prevent the flow of cold water into the mixing chamber 20. This leaves the lower end of the piston 18 spaced from the seat 26 and thus permits hot water to flow therebelow and upwardly into chamber 20.

A temperature sensing power element 37 is provided to actuate the valve piston 18 and control the temperature of the water delivered to outlet 14. This thermal element 37 is shown as being of a type which delivers a relatively large thrust upon the occurrence of some predetermined temperature. One type of such element includes thermally expansible material within a casing 40 which acts upon and extends a thrust member or piston 41 from a cylinder 42 of the thermal element as the temperature of water in the mixing chamber 20 approaches the fusion point of the thermally expansible material. An element of this character is shown and described in Patent No. 2,368,181 which issued to Sergius Vernet on January 30, 1945 and such an element per se is no part of our present invention.

A stirrup 36 is slidably mounted within the valve piston 18 and is arranged to seat against the inturned end 46 thereof. This stirrup 36 lies directly below and in the path of movement of thrust member 41 of the thermal element 37. Stirrup 36 is normally held against flange 46 by an overtravel spring 43 seated at one end on an annular lip 44 extending inwardly from the lower end of the wall of the piston valve 18, and seated at its opposite end on the stirrup 36 and maintaining said stirrup in engagement with the annular lip 46 which may be formed integrally with the valve piston 18 and which extends inwardly from the upper end of the wall of the piston valve 18.

The thermal element 37 is mounted for slidable lengthwise movement within the mixing chamber 20. Specifically element 37 is carried by a shaft or pin 47 extending from a spider 48 encircling the upper casing portion 40 of the valve body and engaging the central portion 49 of the thermal element. The pin stem 47 is mounted for slidable movement through an end plate 51 suitably secured to the end of the valve body and sealed thereto. An O-ring 53a carried in a recess 38 within the sealing plate 51 has sealing engagement with the pin 47. The upper end of the stem 47 is provided with an enlarged head portion 52.

For any given position of the body of the thermal element 37, the mixing valve 10 as thus far described is arranged to deliver water at a desired predetermined temperature through outlet 14. Physically shifting the body of the thermal sensing element 37, however, will alter the temperature of the delivered water because the thrust pin 47 will engage the stirrup 36 at a different temperature point and the relative location of the piston 18 will vary for the same inlet temperatures of water at 11 and 12. Thus by selecting the position of the stem 47, the temperature of the delivered water may be selected.

One of the principal problems to which the present invention is directed is to be able to predetermine and preselect at least two different temperatures, one of which will automatically occur at one stage of a cycle of operation and the other of which will automatically occur at a different stage of an automatic cycle of operation.

As hereinbefore explained the stem 47 is mounted for slidable reciprocable movement within the end plate 51 of the valve housing. The head 52 is arranged to abut the edge surface of a wash cam 56 which is rotatably mounted for turning movement about an axis 53 and to be manually rotatable by a wash cam shaft 54 which carries the cam 56. It may now clearly be seen in FIGURES 1 and 2 of the drawings, that clockwise rotational movement of the cam 56 will cause the stem 47, and the thermal element 37, to move downwardly.

As may be seen particularly in FIGURE 1, the valve body is so arranged that when the wash cam 56 is in the position shown in FIGURE 1 of the drawing, the thrust pin 41 of the thermal element, even when in its most extended position, will be ineffective to react against the metering piston valve and, as a result, will allow only hot water to flow through the valve. On the contrary, when the wash cam 56 is in the position shown in FIGURE 2 the thermal element will be positioned within the mixing chamber in such a way as to admit the flow of cold water only through the valve even though the piston of the thermal element may be entirely inoperative and in its most retracted position.

In automatic clothes washing machines, it is usually desirable to wash the clothes at one temperature and rinse them at a lower temperature. As thus far described, a temperature controlled mixing valve has been described with means for varying the setting to change the wash temperature. Means will now be described to alter the rinse temperature without affecting the wash temperature setting.

Referring now particularly to FIGURE 3 in conjunction with FIGURES 1 and 2 of the drawings, the rinse temperature varying mechanism will be generally described. This mechanism includes a heat motor 57 which is electrically energized under the cyclic control of the washing machine. The heat motor 57 is provided with a thrust piston 58 which is extended upon energization of the heat motor 57. As it extends, it pushes a bellcrank lever 59 against a rinse cam 60. The rinse cam can be prepositioned to the desired temperature setting through a rinse cam shaft 61 (see FIGURE 4) arranged to be manually adjustable independently of the wash cam. Hence, it may be seen that as the heat motor piston 58 moves the upper end of the bellcrank lever 59 against the rinse cam 60 the lever 59 pivots about an axis 63 causing the free end of the lever 59 to move against the control rod 47 and to reposition it accordingly. In FIGURE 3 the rinse cam 60 is arranged to allow the thrust pin 58 to move to an intermediate position to thereby cause a mixture of both hot and cold water to flow through the valve.

As the lever 59 is stopped by the rinse cam 60, further motion of the piston 58 causes the heat motor to back off against an overtravel spring 65. This motion breaks the circuit to the heat motor through the overtravel switch 66 preventing further heating of the heat motor 57. As the heat motor 57 cools slightly, it is returned by the overtravel spring 65, thereby closing the overtravel switch 66 and reenergizing the heat motor 57. In this manner the lever 59 is held against the rinse cam 60 maintaining a fixed position of the control rod with the result that a constant rinse temperature is maintained.

FIGURE 12 diagrammatically illustrates the electrical circuit for controlling energization of the heater coil which may be embedded within the thermally expansible material to effect controlled energization of the heat motor. The heat motor is diagrammatically indicated at H and is energized whenever each of a pair of serially connected switches are in the closed circuit position at the same time. The switch 66 has hereinbefore been described and is normally maintained in the closed circuit position by means of a spring member 65 (see FIGURE 2) and is moved to an open circuit position only upon overtravel of the heat motor 57. Switch S also controls energization of the heater coil H and may, of course, comprise a manually operated switch or may be a switch adapted to be controlled under the cyclic control of the appliance with which the thermostatic valve assembly is associated.

FIGURE 4 illustrates the position of the valve piston 18 within the metering chamber 19 when it is arranged to deliver a mixture of both hot and cold water to the outlet.

Referring now particularly to the more detailed drawings shown in FIGURES 4 and 5, the thermal element positioning means are shown generally as comprising a substantially flat frame portion 67 which terminates into a heat motor support 68 which is arranged to provide a supporting means for the thermal element 57. A cam shaft support 69 is shown as extending from one side of the frame member 67 for means of supporting the camming mechanism hereinafter to be described. The thermal element positioning means are shown as being attached to the end plate of the valve body by means of screws.

The wash cam 56 and the rinse cam 60 are shown as being manually adjustable by means of adjusting knobs 71 and 72, respectively, which are operatively connected to the respective cams by means of the wash cam shaft 54 and the rinse cam shaft 61. The rinse cam shaft is shown as being positioned within the wash cam shaft 54. A simple friction spring 73 is shown as extending around the wash cam shaft 54 and as having its free ends retained in an opening 74 of cam shaft support 69 for purposes of providing a means to keep the wash cam 56 from being moved during the operation of the washing machine. Similar means are provided for maintaining the rinse cam in its proper position and will be hereinafter explained.

The heat motor support 68 is centrally apertured to slidably receive and guide the cylinder portion 75 of the heat motor 57. A compression spring 76 is shown encircling the cylinder 75 of the heat motor 57 and as abutting, at one end, support member 68 and, at the other end, a clamping ring 77 which is held rigidly on the outer end portion of the cylinder 75 as by snapping engagement with the cylinder or the like. A guide member 78 is former integrally with the clamping ring 77 and extends through a slotted portion (not shown) in the frame member 67 in such a manner as to keep the clamping ring 77 from turning. The thermal element or heat motor 57 is like the thermal element 37 within the mixing chamber with the exception that the heat motor 57 is externally heated for the rinsing operation by a resistor heater 79 encircling a casing for the thermally expansible material of the thermal element. It should here be understood that while the resistor heater is referred to as encircling the casing of the thermal element that it also may be contained within the casing, if desired.

The lever 59 previously described briefly, is arranged for pivotal movement about a pivot pin 80 supported in mounting brackets 81, 82, and comprises generally a lever arm 83 and a positioning bar 84. One side of the laterally extending positioning bar 84 is bowed out as at 85 to abut the flanged portion 86 of the piston 58 of the heat motor 57. The positioning arm 84 is also apertured as indicated by the numeral 87 at the bowed out portion 85 to slidably receive the outer end portion of the piston 58.

Referring now more particularly to FIGURE 11 of the drawings it may clearly be seen that the wash cam 56 and the rinse cam 60 are operatively connected to wash and rinse knobs 71 and 72, respectively, by wash and rinse cam shafts 54 and 61, respectively. The wash cam 56 is rigidly connected to the wash cam shaft 54 about the outer circumference thereof. The rinse cam shaft 61 is shown as having a stepped shoulder 88 on the outer end thereof, forming a shaft portion 89 which is smaller in diameter than the diameter of the rinse cam shaft 61 to provide means for mounting the rinse cam 60 thereon. It may now be seen that the wash and rinse cam shafts 54 and 61, respectively, are maintained in proper position by means of cam shaft support 69 spaced near the forward end thereof and by support member 90 which is formed integrally with or rigidly secured to frame member 67.

The wash and rinse cams are held in spaced relation from one another and in their proper positions by means of a wash cam spacer 91 (see FIGURE 10) which functions to hold the wash cam 56 in proper spaced relation from the supporting bracket 90, and by means of the rinse cam spacer 92 which is shown as having spacer member 93 to space the rinse cam 60 in proper relation to the mounting bracket 90, on the opposite side of the bracket from the wash cam. It may also be seen that the rinse cam spacer 92 is provided with two stops 94 (see FIGURE 7) which function to keep the spacer member 92 from moving rotatably about the rinse cam shaft.

As may best be seen in FIGURES 6 and 10 a spring member 95, the base 96 of which is rigidly held against the supporting frame 67, serves to hold the rinse cam 60 on the rinse cam shaft 61 and further serves to frictionally engage one side of the rinse cam to keep the same from moving out of position during the operation of the washing machine.

As may best be seen in FIGURES 6 and 7, taken along section lines VI—VI and VII—VII of FIGURE 5, the rinse cam 60 is provided with a stop 97 which is pressed out in the direction of the wash cam.

It may now be clearly seen from these drawings that the stops 93 and 97 coact to limit the rotational movement of the rinse cam 60. Thus, since there is only one stop on the rinse cam, the cam may be rotated through nearly 360°. As may be seen particularly in FIGURES 9 and 10 of the drawings, the wash cam 56 is also provided with a stop 98 which is formed integrally with the wash cam and which is pressed outwardly therefrom in a direction of the adjusting knobs. Referring now particularly to FIGURE 9 it may be seen that a portion of the frame member 67 is turned upwardly to form a reaction member 99 for the stop 98. Thus the wash cam 56 is also limited so that it cannot rotate through a full 360°.

A torsion spring 100 (see FIGURES 5 and 10) encircles pivot arm 80 and has one of its free ends abutting the supporting frame 67 and has the other of its free ends abutting the laterally extending pivot bar 84. In this way, when the heat motor 57 is inactive, the pivot arm 84 and lever arm 83 are urged to move in a clockwise direction about the pivot pin 80 as seen in FIGURE 4.

The resistor heater encircling the heat motor 57 is in constant electrical contact with the conductor 101 in the overload switch 102. The electrical connection between the resistor heater encircling the heat motor and the conductor 101 may be accomplished by means of grounding one end of the resistor heater to the heat motor causing and by electrically connecting the conductor 101 with some part of the casing or by means of running a wire from the conductor 101 to an upstanding portion of the resistor heater. A second conductor 103 is held in spaced relation from conductor 101 by means of an insulating material 104 spaced therebetween and terminates in a depending contact point 105. A second contact 106 is connected to the resistor heater within the heat motor and is arranged to intermittently connect the conductor 103 with the resistor heater. Overtravel switches, such as are described here, are old in the art and form no part of the present invention so will not be described further in detail.

Before the beginning of the wash cycle, the operator may move both the wash and rinse adjustment knobs 71 and 72 respectively, in order to predetermined and preselect the temperature of the water for both the washing and the rinsing operations at any temperature through a temperature range of say 90° F. to 130° F. This range may be altered, of course, being dependent only upon the type of thermal element used in the mixing chamber and the temperature of the water supplied to the valve. The temperature range noted above is only illustrative of a temperature range which might conveniently be used.

Rotation of the wash adjusting knob 71, through the wash cam shaft 54, causes rotation of the wash cam 56. In a like manner the rinse cam 60 is rotated as the rinse cam adjustment knob is rotated. If it is desired to admit only the flow of hot water through the valve during the wash cycle the wash adjustment knob 71 would be rotated to its extreme counterclockwise position until the stop 98 comes in contact with the reaction member 99. In this way the control rod 47, the thermal element 37, and the metering piston 18 will be moved to the position shown in FIGURE 1 by the return spring within the mixing chamber. Obviously, rotating the wash cam 56 in a clockwise position from that position previously described will cause the stem 47, the thermal element 37, and the metering piston 18 to move downwardly within the valve body thus effecting a cooler and cooler temperature of the water delivered to the outlet 56. It should also be noted here that when the thermal element is in the position shown in FIGURE 1 the thermal element will be ineffective to cause any movement of the metering piston even when the piston is in its most extended position.

The rinse cam 60 is ineffective to cause any positioning of the thermal element 37 until the rinse cycle begins. When the rinse cycle is automatically started by the cycling mechanism of the washing machine, the heat motor 57 will be energized, through the cyclic control of the washing machine. When current is supplied to the resistor heater 79 encircling the housing of the heat motor 57, heat will be generated causing the piston 58 to move extensibly until the piston comes in contact with the rinse cam 60. At that time the heat motor 57 will begin backing off from the cam 60 against the pressure of the overload spring 76 until the current to the resistor heater is broken due to the separation of electrical contacts 105 and 106. After the thermally expansible material within the heat motor 57 has begun to cool, the overload spring 76 will cause the heat motor to be moved in such a manner that the contacts 106 will again become electrically connected and this cycle will be repeated. It may now clearly be seen that as long as current is supplied to the overtravel switch 102 the heat motor 57 will function to keep the piston 58 in constant contact with the rinse cam 60.

The flange 86 of the piston 58 will always be in contact with pivot arm 84 of the lever 59 so that the degree to which the lever arm 59 rotates is dependent upon the distance to which the piston 58 is allowed to extensively move from upstanding frame member 68 by the rinse cam 60. As may most clearly be seen in FIGURE 8, counterclockwise rotational movement of the lever 59 about pivot pin 80 is arranged to cause downward movement of the control rod 47, thermal element 37, and the metering piston within the mixing chamber. Hence, when the rinse cam 60 is in its extreme counterclockwise position as may most clearly be seen in FIGURE 7 the piston 58 is allowed little, if any, extensible movement with respect to the upstanding frame member 68 so that no rotational movement of the lever 59 is affected. In this position it may clearly be seen that the positions of the control rod 47, the thermal element 37, and the metering piston are the same as those described above with respect to the hot water position of the wash cam. This is shown diagrammatically in FIGURE 1. However, when the rinse cam 60 is rotated to its extreme clockwise position the thrust pin 58 will be allowed a great deal of extensible movement thus rotating the lever 59 in a counterclockwise direction and affecting downward movement of the control rod 47, the thermal element 37, and the metering piston. Obviously, when the rinse cam is in this position very cold water will be delivered to the outlet 56. Such a position as this is shown in FIGURE 2. When the control rod 47, thermal element 37, and the metering piston are in this position, whether it be during the rinse or wash operation, the thermal element 37 will be ineffective to allow the metering piston any upward movement even though the piston is in its most retracted position.

It is to be understood that although the arrangement of parts has been shown for only three temperature positions, any temperature between the temperature of the cold water entering the valve and the hot water entering the valve may be selected so long as the temperature of the rinse water desired is the same as or lower than the wash temperature.

It should now be clear that both the temperature of the wash water and the temperature of the rinse water desired may be selected prior to starting the appliance and that either setting may be changed any time desired whether or not it is during the operation of the appliance.

It will be further understood that applicant's novel device obviates the difficulties encountered in connection with mounting similar devices in such a way that the controlling knobs are exposed on the control panel of a washing machine or the like in that the shafts for manually adjusting the control cams are constructed substantially at right angles to the axes of both thermal responsive elements and the piston valve and that the control knobs are separated from the controlling cams. Obviously, with this arrangement the control knobs can be exposed on the control panel of the washing machine or the like and all necessary electrical connections can be concealed beneath the control panel.

It will be understood that this particular embodiment of the invention has been used for illustrative purposes only and that various modifications and variations of the present invention may be effected without departing from the spirit and scope of the novel concepts thereof.

We claim as our invention:

1. In a thermostatic mixing valve, a valve body having a mixing chamber therein, hot and cold water inlets into said mixing chamber, an outlet from said valve body and mixing chamber, a metering valve in said mixing chamber metering the flow of hot and cold water thereinto, a thermal element in said mixing chamber for operating said valve and carried in said mixing chamber for longitudinal floating movement therealong, a control rod reacting against said thermal element, a cam engageable with said control rod, means for adjusting said cam to vary the position of said control rod, a lever engageable with said control rod, means for moving said lever to vary the position of said control rod irrespective of the position of said cam, a second cam engageable with said lever to limit movement thereof, and means for adjusting said second-mentioned cam to determine the limit of movement of said lever.

2. In a thermostatic mixing valve, a valve body having a mixing chamber therein, hot and cold water inlets leading into said mixing chamber, an outlet from said valve body and mixing chamber, a metering valve in said mixing chamber metering the flow of hot and cold water thereinto, a thermal element in said mixing chamber for operating said valve and carried in said mixing chamber for longitudinal floating movement therealong, a control rod reacting against said thermal element, a cam engageable with said control rod and manually adjustable to vary the position of said thermal element within said mixing chamber in accordance with a desired delivery temperature of water through said outlet, a lever engageable with said control rod and adapted to move same independently of said cam, a second thermal element for rotatably moving said lever to position the first mentioned thermal element within said mixing chamber in accordance with a second desired delivery temperature of water through said outlet, a second cam engageable with said lever to limit the degree of rotational movement thereof, and means for heating said second thermal element.

3. In a thermostatic mixing valve, a valve body having a mixing chamber therein, hot and cold water inlets leading into said mixing chamber, an outlet from said valve body and mixing chamber, a metering valve in said mixing chamber metering the flow of hot and cold water thereinto, a thermal sensitive power means in said mixing chamber for operating said valve and carried in said mixing chamber for longitudinal floating movement therealong, a control rod reacting against said thermal element, a cam engageable with said control rod and manually adjustable to position said power means within said mixing chamber in accordance with a desired delivery temperature of water through said outlet, a lever engageable with said control rod, a second thermal sensitive power means cooperable with said lever to position said first mentioned power means within said mixing chamber in accordance with a second desired delivery temperature of water through said outlet, a second cam engageable with said lever to limit the degree of rotational movement of said lever, and electrically energizable means operable to heat said second thermal element and maintain said lever in a fixed relation with respect to said second cam to effect the delivery of water through said outlet at a temperature selected by the position of said second cam.

References Cited in the file of this patent
UNITED STATES PATENTS

| | | |
|---|---|---|
| 1,225,887 | Swan | May 15, 1917 |
| 2,223,918 | Monney | Dec. 3, 1940 |
| 2,442,886 | Bowen | June 8, 1948 |
| 2,489,896 | Kempton | Nov. 29, 1949 |
| 2,810,523 | Branson | Oct. 22, 1957 |
| 2,830,766 | Algino | Apr. 15, 1958 |